Sept. 14, 1948.　　　　R. A. PETERSON　　　　2,449,085
SUBMERSIBLE SEISMOMETER SYSTEM
Filed Dec. 12, 1944
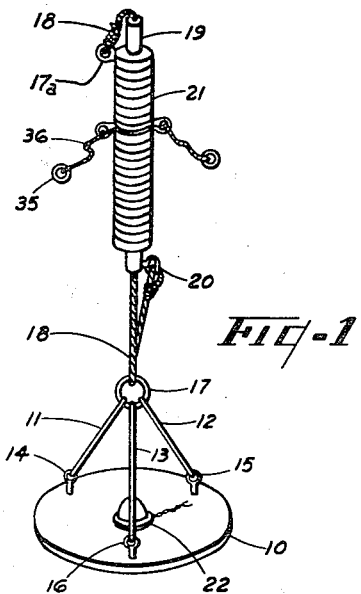
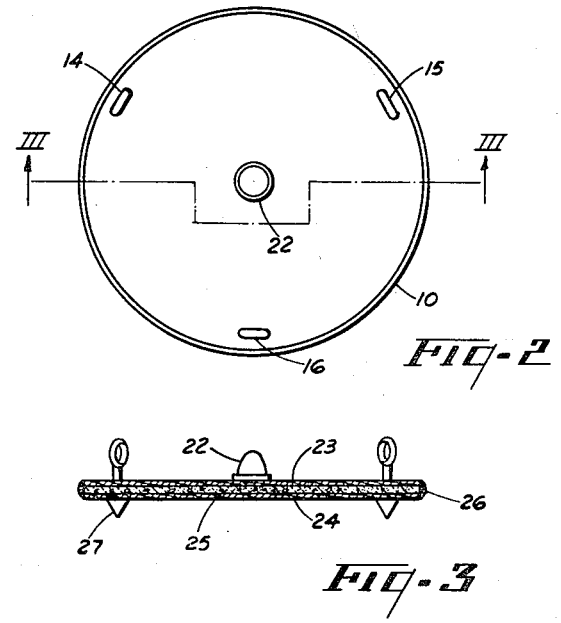
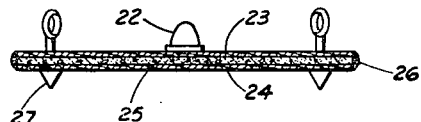
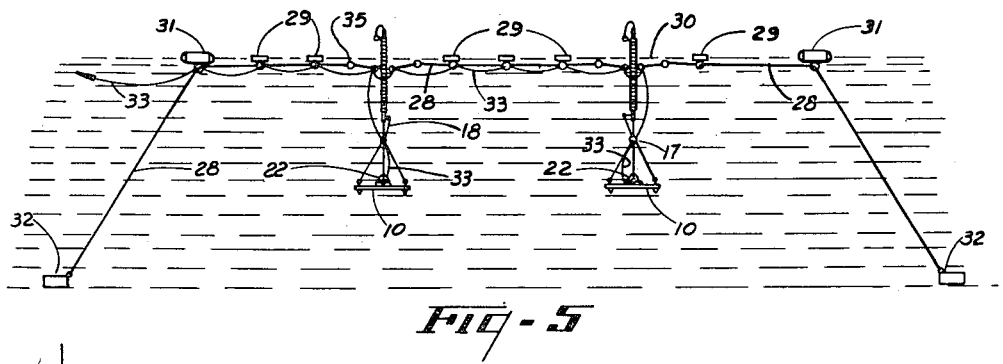
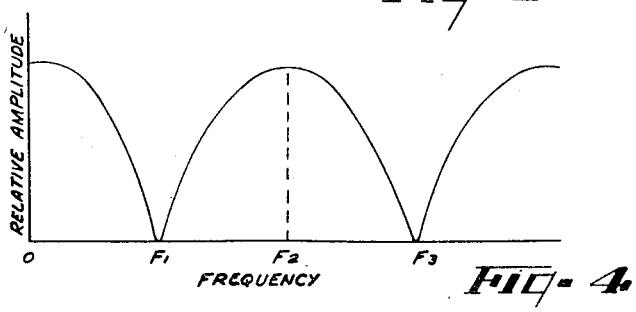
INVENTOR
RAYMOND A. PETERSON
BY
Christie & Angus
ATTORNEYS Patented Sept. 14, 1948

2,449,085

UNITED STATES PATENT OFFICE 2,449,085

SUBMERSIBLE SEISMOMETER SYSTEM

Raymond A. Peterson, Pasadena, Calif., assignor, by mesne assignments, to United Geophysical Company, Inc., Pasadena, Calif., a corporation of California Application December 12, 1944, Serial No. 567,891

7 Claims. (Cl. 177—352)

This invention relates to seismic wave reception and particularly to the reception of seismic waves in a water medium.

In the art of prospecting for mineral deposits such as petroleum beneath the earth's surface by seismic methods, it has heretofore been a common practice to drill a hole into the earth and set off a charge of explosive in the hole to generate seismic waves which travel through the earth. Such seismic waves, upon striking some subterranean layers, are reflected or diffracted. The seismic waves are received by a suitable detecting device, commonly called a seismometer, placed in or near the earth's surface. The seismic waves received at the seismometer are converted into corresponding electrical waves which may be amplified and caused to produce a permanent record and thus information in respect to the subterranean layers may be obtained.

In prospecting on dry land by such seismic methods, the seismometer is placed in firm contact with the earth to permit efficient transmission of the waves from the earth to the responsive seismometer element. When prospecting is done in regions of the earth's surface which are beneath the water, the seismometer is brought into contact with the water so that the seismic waves travelling through the water may similarly transmit their energy to the seismometer element. Owing to the fluid nature of water, and also to the fact that bodies of water commonly have waves set up in them from other than the seismic sources, various expedients have heretofore been employed for transmitting to the seismometer from the water, as large an amplitude of the seismic wave relative to the extraneous waves as is possible.

According to my invention, I provide an arrangement which I have found exceptionally well suited for the efficient transmission or coupling to the seismometer of the seismic waves in the water, while eliminating from the seismometer most of the undesirable extraneous waves in the water. I carry out my invention by the provision of a platform preferably non-resonant at frequencies within the principal seismic wave frequency range, and provided with a suspension means for holding it suspended at some distance beneath the surface of the water from a float.

A feature of my invention is the construction of the float to be relatively unresponsive to extraneous wave motion.

Another feature of my invention is a system of floats in cooperation with the suspended platforms supporting the seismometers so that a number of seismometers may be placed along a course at which it is desired to receive seismic waves.

My invention will be better understood from the following detailed description and the accompanying drawing of which:

Fig. 1 shows a seismometer platform suspended from a float in accordance with my invention;

Fig. 2 is a plan view of the platform shown in Fig. 1;

Fig. 3 is an elevation cross-section view taken at line III—III of Fig. 2;

Fig. 4 shows a typical wave amplitude vs. frequency characteristic at a seismometer in the water; and Fig. 5 shows an organization of a number of suspended seismometer platforms.

Referring to Figs. 1, 2 and 3, the platform 10 preferably, but not necessarily circular in shape, is suspended by a plurality of cords 11, 12 and 13 fastened at their lower ends to suitable fastening devices on the platform, such as eyes 14, 15 and 16, and at their upper ends to a fastening ring 17. The fastening ring is attached to suspension cord 18, one end of which is tied or otherwise suitably attached to the lower end of a pole 19, as by a suitable eye 20. Preferably the cord is looped through ring 17 as shown, and brought up through a longitudinal bore in pole 19, to the top of the rod where it may be fastened to a suitable cleat 17a. In this way the level of the platform below the rod may be adjusted. The pole 19 is the core of a spar buoy or float and is provided with a number of annular rings 21 of cork or other porous, buoyant material. The spar buoy is provided with enough buoyancy to remain afloat at the surface of the water while supporting beneath it the suspended platform 10 with a seismometer 22 supported on it as shown.

The platform 10 should be of large enough area so that it will be set into vibration as a whole in correspondence with seismic waves in the water, and yet will not develop resonance points within the principal band of seismic frequencies. A diameter of about 20 inches has been found suitable and will provide sufficient area for efficient coupling with the water in respect to the seismic wave vibrations. For the purpose of deadening the platform to undesired self-resonance, I have constructed the platform as shown in detail in Figs. 2 and 3, in the form of a sandwich formed by two disks 23 at 24, preferably of a non-resonant wood such as a marine plywood, and a layer of tar 25 between them. The wood disks and the tar layer between them may each conveniently be made about ½" thick. For the purpose of holding the tar in position and preventing it from flowing out, a thin metal band 26, for example, of steel, is placed around the periphery of the platform 10. In case the weight of seismometer 22 is not sufficient to submerge the platform to the distance allowed by the suspension cords, there may be provided additional weights or feet 27, which may be of heavy metal such as lead and preferably conically shaped, screwed into the bottom disk 24 as shown.

In order to eliminate or minimize the effect of wave motion at the surface of the water, the spar buoy should be constructed to be substantially unresponsive to such motion and also so as not to be set into vibration upon being slapped by surface waves. This is accomplished by the provision of the effectively deadened annular rings 21, of cork or the like, which should be made to fit snugly around the center pole 19 which is preferably made of strong non-resonant material.

In order further to deaden undesired vibrations, the suspension cords supporting the platform should preferably be made of an elastic material such as rubber which will serve to allow the platform to maintain a constant position beneath the surface of the water in spite of some vertical motion of the spar buoy which might take place. For this purpose either the cords 11, 12, 13 or the cord 18 might be made elastic. Or if desired, both sets of cords could be made elastic.

The type of seismometer 22 used on the platform should preferably be the velocity or displacement-responsive type, that is having an electrical output proportional to the velocity or displacement of the received seismic waves. The reason for this preference for the velocity or displacement-responsive seismometer over the pressure-responsive seismometer resides in the fact that throughout the principal seismic wave range, there is greater amplitude of wave displacement and velocity than of pressure in the water. The most important of the seismic wave range lies below a frequency of about 200 cycles per sec., and more particularly between about 30 and 100 cycles per sec. The general characteristic of the wave amplitude in the water is illustrated graphically in Fig. 4 wherein the ordinate representing relative displacement or velocity amplitude is plotted against frequency. The curve shows that at any position in the water where the seismometer is located, the displacement or velocity amplitude is a maximum at zero frequency and remains relatively high throughout a low frequency range extending upwardly from zero frequency. The amplitude then drops rapidly to a minimum at a frequency $F_1$, this minimum being due to cancellation of vertically travelling seismic waves by the reflected waves from the surface. At the higher and still less important frequencies, the characteristic becomes recurrent, as shown, that is, the amplitude increases to a maximum at a frequency $F_2$ and drops again to a minimum at a higher frequency $F_3$, and so on. The pressure amplitude characteristic (not shown in the figure) would on the other hand be complementary to the velocity or displacement amplitude characteristic shown, as the pressure amplitude would be about zero, at zero frequency, and would not increase to a maximum until a substantially high frequency, well above the important seismic range, is reached. Consequently, in the seismic range, the pressure amplitudes would be so low as to produce little response at the seismometer.

It is possible by regulating the depth of submergence of the seismometer beneath the surface to select the minimum response frequencies such as $F_1$. The reason for this is that the frequency of the reflected wave which cancels out the directly received wave will be that corresponding to the distance of travel through the water from the seismometer to the point of reflection, which is the water surface. This adjustment may be readily accomplished according to the arrangement of Fig. 1 by raising or lowering the platform 10 by means of cord 18. Such an adjustment may be particularly useful where a wave of a particular frequency is undesired, for example, an undesired frequency present in the seismic wave train. The depth may be so adjusted that this undesired frequency becomes the frequency $F_1$.

Fig. 5 shows an arrangement which may be used for placing a number of seismometers along a line or course as is frequently desired in seismic recording work. This comprises a number of platforms 10, suspended from their floats or buoys, each platform containing a seismometer. The several platforms are spaced at definite positions by means of a strong line or cable 28 fastened to the rings 35 tied to the pole near the water line by ropes or cords 36, and supported on floats 29, floating on the surface of the water 30. At each end of the course or line of seismometer platforms, there is provided an end buoy 31 to which the cable 28 is fastened and passed down to an anchor 32 placed on the bed of the water body. The wires from the several seismometers may be taken out through suitable cable 33 which may be strung from one seismometer to the next in the course by suitable attachment to the spar buoys, floats and buoys as shown; and at the end of the course, the cable 33 may lead to the receiving instruments, for example on the shore or in a boat.

By my invention, I have provided a practical means for coupling a seismic-wave responsive device to receive the wave motion from a water medium. By reason of the deadening of the platform and the supporting spar buoy being relatively responsive to extraneous wave motion, little interference is had from such extraneous wave sources in the water medium. In consequence, records made of waves detected from the seismometers are clearly readable and free from extraneous interfering wave sources.

I claim:

1. Means for coupling a seismic detecting device to a water medium carrying seismic waves, which comprises a float for floating at the surface of the water and a platform adapted to be submerged in the water suspended from the float and adapted to have placed thereon the seismic detecting device, the platform being non-resonant at frequencies within the effective seismic wave range and being sufficiently rigid to be set into vibration as a whole in correspondence with seismic waves in the water.

2. Means for coupling a seismic detecting device to a water medium carrying seismic waves, which comprises a float for floating at the surface of the water, and a platform adapted to be submerged in the water suspended from the float and adapted to have placed thereon the seismic detecting device, said platform comprising a layer of viscous material sandwiched between two layers of rigid material.

3. Means according to claim 2 in which said viscous material is asphalt and said rigid material is wood.

4. Means for coupling a seismic detecting device to a water medium carrying seismic waves, which comprises a spar buoy for floating at the surface of the water and a platform adapted to be submerged in the water and suspended from the lower end of said buoy, the platform being adapted to have the seismic detecting device placed thereon and being non-resonant to frequencies within the effective seismic wave range and being sufficiently rigid to be set into vibration as a whole in correspondence with seismic waves in the water.

5. Means for coupling a seismic detecting device to a water medium carrying seismic waves, which comprises a float for floating at the surface of the water, and a platform adapted to be submerged in the water suspended from the float and adapted to have placed thereon the seismic detecting device, said platform being submerged beneath the water surface by a distance such that waves reflected from the water surface cancel directly-received waves at a predetermined frequency which is undesired for reception.

6. Apparatus according to claim 5 in which the depth of the platform beneath the float is adjustable for adjusting the undesired frequency.

7. A system for receiving seismic waves in a water medium, comprising a plurality of floats for floating at the surface of the water, a platform suspended from each float in the water, said platform being constructed to be set into vibration as a whole in correspondence with seismic waves in the water, a seismic wave detecting device placed on each platform, said floats being joined by a cable, said cable being held at the surface of the water by a plurality of floats in addition to the first-mentioned plurality of floats, and means for anchoring the cable.

RAYMOND A. PETERSON.

REFERENCES CITED

The following references are of record in the file of this patent:

UNITED STATES PATENTS

| Number | Name | Date |
|---|---|---|
| 421,686 | Fagan et al. | Feb. 18, 1890 |
| 1,636,576 | Rudolph | July 19, 1927 |
| 2,241,428 | Silverman | May 13, 1941 |
| 2,300,565 | Goloviznin | Nov. 3, 1942 |
| 2,307,792 | Hoover | Jan. 12, 1943 |
| 2,310,017 | Canon et al. | Feb. 2, 1943 |